(No Model.) 2 Sheets—Sheet 1.
J. S. BRIGGS.
FRUIT STONING MACHINE.
No. 490,265. Patented Jan. 24, 1893.
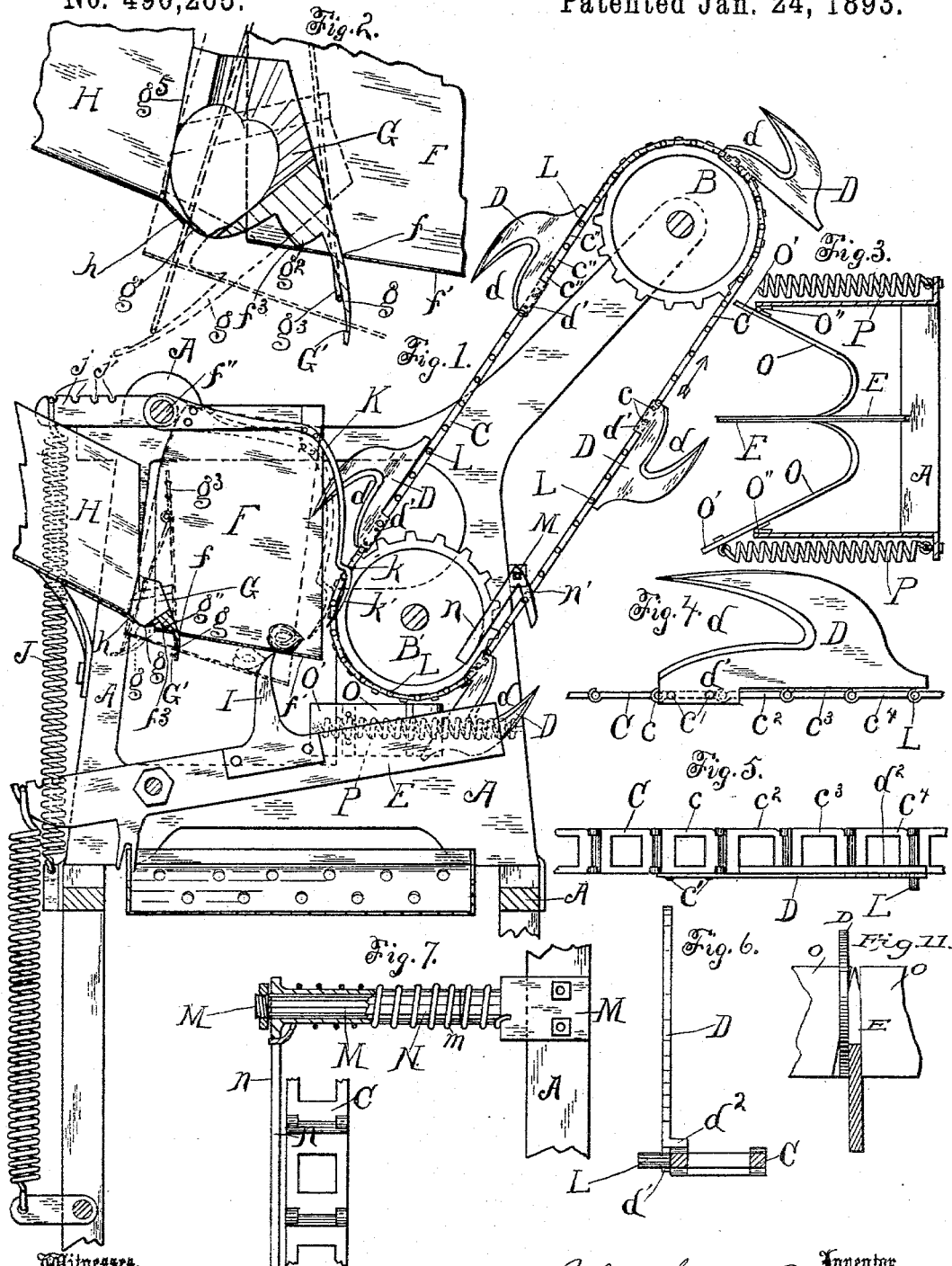
Witnesses.
M. W. Gee.
Alfred I. Townsend.
Inventor.
John Smith Briggs
By Hazard & Townsend
his attys (No Model.) 2 Sheets—Sheet 2.
J. S. BRIGGS.
FRUIT STONING MACHINE.
No. 490,265. Patented Jan. 24, 1893.
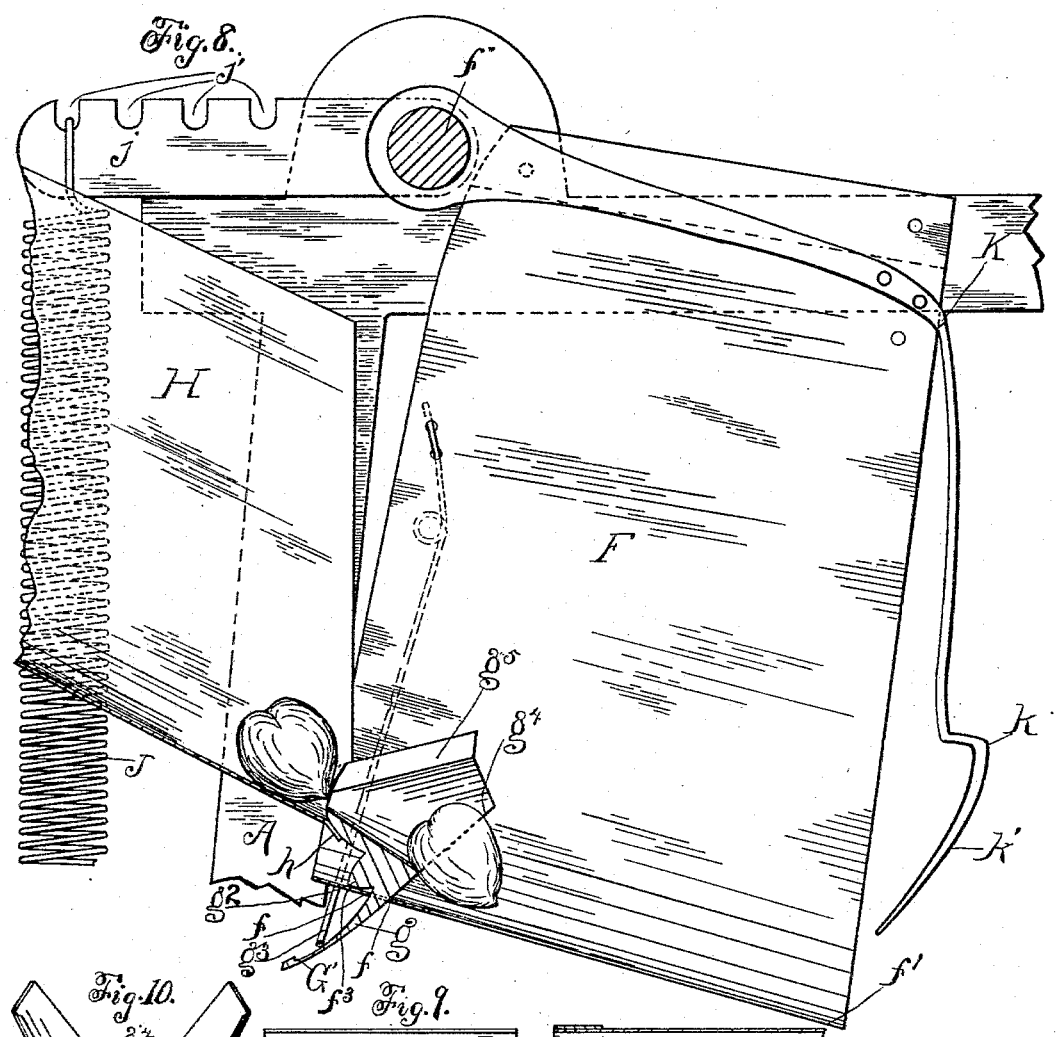
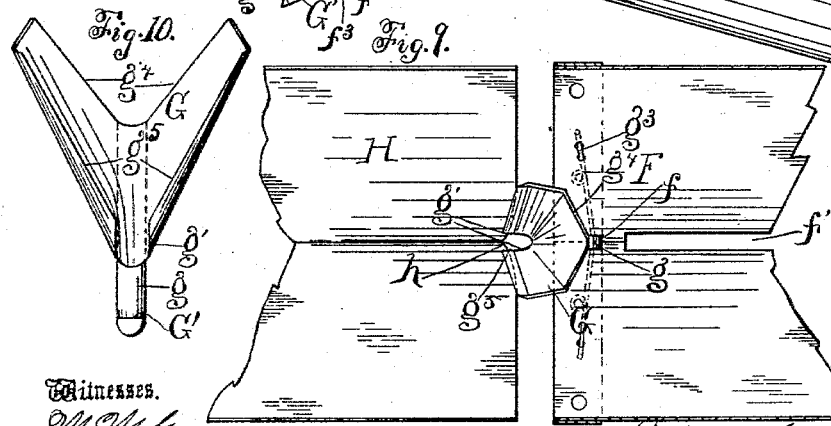
Witnesses.
M. M. Gee
Alfred I. Townsend
Inventor.
John Smith Briggs
by Hazard & Townsend
his attys

UNITED STATES PATENT OFFICE.

JOHN SMITH BRIGGS, OF SAN BUENAVENTURA, CALIFORNIA.

FRUIT-STONING MACHINE.

SPECIFICATION forming part of Letters Patent No. 490,265, dated January 24, 1893.

Application filed April 12, 1892. Serial No. 428,772. (No model.)

*To all whom it may concern:*

Be it known that I, JOHN SMITH BRIGGS, a citizen of the United States, residing at San Buenaventura, in the county of Ventura and State of California, have invented a new and useful Improvement in Fruit-Stoning Machines, of which the following is a specification.

My invention relates more particularly to a certain fruit stoning machine described and claimed by me in Letters Patent No. 460,740, dated October 6, 1891.

My invention relates to certain improvements and modifications of the machine as described and claimed in the above mentioned patent, whereby I am enabled to use a sprocket chain having a series of cutting knives secured thereupon, instead of a rotary disk having such knives upon its periphery, as therein described and claimed.

My invention also relates to the means employed for feeding the fruit to the cutters, and also to the means for removing the pit from the knives after the meat has been removed from the pit.

My invention also comprises various features and combinations hereinafter fully set forth and claimed.

The accompanying drawings illustrate my invention.

Figure 1 is a fragmentary longitudinal vertical sectional view of a machine illustrating my invention. Fig. 2 is a fragmentary longitudinal mid-section of the troughs H and F and the oscillating feed cup, G. Fig. 3 is a fragmental plan view showing the manner of applying the spring tension to the spreaders. Fig. 4 is a plain side elevation of a fragment of the sprocket chain, with a blade attached thereto. Fig. 5 is a plan view of the same. Fig. 6 is a rear elevation of the same. Fig. 7 is a rear elevation partially in section of my improved device for removing the pits from the pit engaging knife edges $d$. In this view a fragment of the sprocket chain is shown to illustrate the relative position of the device to such chain. Fig. 8 is an enlarged fragmental sectional detail of the tilting trough and oscillating feed cup, with a fragment of the stationary trough. In this view the trough F is shown tilted into its lowest position thus throwing the oscillating cup into position to discharge the fruit into the tilting trough. Fig. 9 is a fragmentary plan view showing the oscillating cup in position to receive fruit from the stationary trough H, and showing a fragment of such trough, and of the tilting trough F. Fig. 10 is a plain front elevation of the oscillating cup. Fig. 11 is a fragmentary front view illustrating the positions of the spreaders O, the knife E, and a blade entering between one of the spreaders and the knife E.

In the drawings A represents the frame of the machine. Upon this frame are mounted two suitably journaled sprocket wheels B B' over which run an endless sprocket chain C, which has a series of blades D attached thereto each blade being provided with V or hook shaped knife edges $d$ opening toward its front face.

In the drawings a chain belt is shown arranged to carry the blades D but it is to be understood that the blades may be attached to a belt of any other suitable character adapted to accomplish the same object, viz:—to carry the blades and force them through the fruit, and I do not limit myself to the use of a sprocket chain belt for carrying the blades. A yielding knife E is arranged parallel with the path of the revolving blades and normally close to such path to assist in severing the meat of the fruit in conjunction with the V shaped knife edges of the blades D, in the manner described and claimed by me in my previous patent hereinbefore mentioned. The blades D are secured to their respective links $c$ of the sprocket chain by rivets $c'$ (which may be cast upon one edge of the link and integral therewith) which pass through suitable rivet holes in the body $d'$ of the blade D and rigidly secure the link and blade together.

To steady the blades D and provide additional bearing and support for them upon the chain C, a portion of the body of each blade is bent at right angles to the plane of the blade to form the stop $d^2$ which rests upon the top of the side members of the following links $c^2$ $c^3$ $c^4$ respectively, and thus assist in steadying the blades and preventing cramping and twisting of the links to which the blades are attached when such links are not supported by passing over the wheels B B'.

In order to adapt the machine to remove stones from ungraded fruit of widely varying sizes without allowing more than one fruit to be fed to the cutters at one time, I have rigidly attached the tilting trough F to a shaft $f''$ which is journaled to the frame A, and arranged at a point nearly on a line with the front or upper end of the trough, and have arranged at the upper end of such trough a suitably mounted oscillating funnel shaped feed cup G, having a downwardly projecting curved arm $g$ arranged upon its rear side, passing through an arm receiving opening $f$ provided in the bottom of the front end of the tilting trough for its reception. The rear end of the trough F is provided with a slot $f'$ to allow the passage of the blades D therethrough.

The funnel shaped oscillating cup is provided in the front with a V shaped receiving opening $g^5$. Suitable means are arranged for feeding fruit into the cup through such opening, such as the stationary feed trough or chute H, which has its lower end provided with a flaring lip $h$ to form a seat or support for the front portion of the bottom of the feed cup to rest upon when in its normal position, and to form a guide for the rounded bottom $g'$ of the feed cup to slide upon to oscillate the cup to discharge its contents when the trough F is tilted, as indicated in dotted lines in Figs. 1 and 2 and is shown in solid lines in Fig. 8. The funnel shaped form of this feed cup and the V shape of the opening $g^5$ allows but one fruit, be it large or small, to enter the cup at one time, and as soon as the cup begins to oscillate, the bottom of the cup is thrown upward above the bottom of the feed trough H, and forms a stop against which the fruit in the feed trough H rests until the cup returns to its normal position. An opening $g^4$ is provided in the rear of the cup to facilitate the discharge of the fruit. The cup oscillates upon a pivotal point $g^2$ which projects downward from the rear portion of the bottom of the cup, and which point rests upon the bottom $f^3$ of the tilting trough which forms the pivotal point of support therefor. The spring $g^3$ which is secured to the trough F presses against the arm $g$ of the feed cup to cause the cup to return to its normal position when the tilting trough is returned to its normal position. The arm $g$ projecting through the opening $f$ in the trough F prevents displacement of the cup. The spring $g^3$ is arranged to engage the catch G' which is provided upon the arm $g$ of the cup to prevent accidental upward displacement of the cup G.

The means for oscillating the cup comprises the flaring lip $h$ of the chute H which is arranged to form a support for the front of the cup, practically beneath the pivot $f''$ at a distance therefrom less than the distance between such pivot and the bearing which supports the pivotal point $g^2$ of the oscillating cup G, and a spring J, arranged (through the medium of an arm $j$ which is fixed to the tilting trough) to normally hold the tilting trough and such pivotal point to the rear of the flaring lip of the chute, so that when the tilting trough is forced downward and toward the support $h$ as hereinafter described the cup is subjected to a twisting action between the two points of support; when the the tilting trough F is forced forward the rounded bottom $g'$ of the oscillating cup is forced upward by its engagement with the flaring mouth $h$, the support $f^2$ and the pivoted point $g^2$ being lowered at the same time the cup slides upon the end of the trough and assumes the position shown in dotted lines in Figs. 1 and 2, and in full lines in Fig. 8 thus causing the fruit to be discharged backward from the cup and be deposited in the tilting trough F, where it rolls downward toward the lower end of such trough, but is engaged by the stop I which is fixed upon the knife E and is arranged to project upward through the slot $f'$ in the bottom of the tilting trough when such trough is tilted. The normal position of the stop I and trough F is shown in full lines in Fig. 1, and the position when in action is indicated in dotted lines in the same view representing the trough tilted. Thus the fruit is prevented from rolling down and out of the lower end of the trough when the trough is tilted, and as the trough swings toward the rear the fruit is thus carried into the path of the traveling blades.

In order to prevent any jar when the tilting trough is returned to its normal position by the action of the spring J which is attached at one end to a projecting arm $j$ fixed to the shaft $f''$, and to the frame of the machine at the other end, I provide the trough actuating arm K (which is rigidly connected with the tilting trough F) below its pin engaging shoulder $k$, with a downwardly projecting arm $k'$ which is arranged at a slight angle with the path of the traveling trough tilting pins L so that when a pin is released from the shoulder $k$ the arm $k'$ will engage the pin and by reason of the arm $k'$ being at an angle with the line of travel of the pin, the pressure of the arm against the pin will assist the pin to slide downward along the arm while at the same time the arm is ascending to its normal position. The angle and the length of the arm $k'$ are such that by the time the pin has reached the bottom of the arm, the tilting trough F will have assumed approximately its normal position, thus giving a cam motion which presents any sudden jar to the tilting trough in returning, and also utilizing the tension of the spring J to assist the operation of the machine.

The actuating pins L are cast integral with their respective links of the sprocket chain C and are arranged along the chain to tilt the trough F downward and forward as soon as the knife has entered the fruit, to carry the trough out of the way to avoid bruising the fruit by pressure against such trough, in the manner shown in my former patent.

To provide more convenient means than described in my previous patent for removing the pits from the V shaped knife edges after the meat has been removed from such pits as described in my said previous patent, I attach a spindle M to the frame of the machine, and upon this spindle is journaled a sleeve N which is provided at one end with a sweep arm n and a sweep actuating arm n' rigidly attached to each other and to the sleeve N, the sweep arm n and the sweep actuating arm n' being arranged at an angle with each other; the sweep actuating arm n' also being arranged to normally project into the path of the traveling actuating devices or pins L which are arranged to engage therewith and move it upward to actuate the sweep thus causing the sweep arm n to sweep past the blades D, and dislodge the pits from the V shaped knife edges d. Suitable means are provided for returning the arms to their normal position, such as the spring m.

Another feature of my invention consists in the peculiar construction and arrangement for applying the spring tension to the spreaders O which are arranged to spread and strip the meat of the fruit from the pit. This feature consists in extending an arm O' from the body of the spreader to a point beyond the pivotal point O'' upon which such spreader swings, and attaching to the end of such arm a tension spring P, the other end of which is fastened to the frame of the machine at the rear of such spreader; the arm O' and the axis of the spring P being arranged to describe an angle not greater than a right angle with each other, so that when the spreaders are entering the cut made in the fruit by the yielding knife E and the knife edges d, the spring will have the greatest leverage and hold the spreaders firmly against the side of the blade D and the yielding knife E until the spreaders engage the pit of the fruit. This engagement causes the spreaders to swing backward and outward, thus throwing the arms O' inward. As the arms move inward they pull the springs sidewise nearer to the pivotal points O'' of the spreaders thus reducing the leverage and allowing the pit to pass between the spreaders with very slight resistance from the springs after the spreaders have begun to move apart.

Provision must be made for the passage of the blades D between the yielding knife E and the spreaders O. For this purpose the edge of one of the spreaders is arranged slightly oblique away from the knife E. (See Fig. 11.) This allows the points of the hook blades to enter between the knife and the spreader and allows the spreader to engage the pit of the fruit, and further progress of the blade presses the spreaders to one side and permits the blade to pass freely.

In practice the fruit is fed into the chute H and rolls downward into the oscillating funnel shaped cup G, which allows but one fruit to enter the cup because of its sloping walls and V shaped mouth or opening $g^5$. If a small fruit enters the cup it occupies the center thereof and prevents the following fruit from fully entering; as the cup oscillates, the following fruit is held from passing farther into the cup by the fruit which is therein until the bottom of the cup is brought into contact with the following fruit and rises upward in front thereof and forms a stop which closes the passage in the cup. When the fruit is deposited in the tilting trough F by the oscillation of the feed cup, it rolls against the stop I which engages and stops the fruit at a point in the tilting trough which is in the path of the blades D when the trough is in its normal position. When the trough returns to its normal position it thus carries the fruit into the path of the knives which enter the fruit and carry it downward against the yielding knife E and the spreaders O which remove the meat from the pit in the manner described and claimed in my former patent. The trough F being supported by the tension of the spring J the resistance of the arm K to the passage of the pins L may be regulated as desired by shifting the end of the spring into the notches $j'$ provided in the arm $j$. The action of the knife E and the spreaders O causes the pit of the fruit to become tightly wedged in the V shaped knife edges d, but when the blade D is passing the sweep arm n and the pins L engage the sweep actuating arm n' and causes the arm n to sweep upward along the side of the blade and so sweep the pit upward and release it from engagement with the knife edges.

Now having described my invention what I claim as new and desire to secure by Letters Patent is;—

1. The combination in a fruit stoning machine of an endless chain or belt having a series of blades attached thereto; such blades respectively provided at one end with V shaped knife edges; suitable means arranged to feed the fruit into the path of such V shaped knife edges; means arranged to carry and drive the chain or belt; and a suitable yielding knife arranged to be normally close and move in a plane parallel with the path of the traveling knives.

2. The feeding device set forth comprising the combination of a suitably mounted oscillating funnel shaped cup having a receiving opening in its front; suitable means arranged to feed fruit into such cup through such opening; suitable means arranged at the rear of such cup to receive the fruit therefrom when the cup is oscillated, and means for oscillating the cup.

3. In a fruit stoning machine the combination of the tilting trough provided in its bottom near the front end with the arm receiving opening $f$; the support and guide for the front portion of the cup arranged in line with the tilting trough, and the oscillating cup G provided with the arm $g$ inserted through the opening $f$ and having the front portion of its bottom arranged to engage the support; the pivotal point $g^2$ arranged between the arm $g$ and the rounded bottom of the cup to rest upon the bottom of the trough, and means for holding the cup in engagement with the support.

4. The combination of the tilting trough; the oscillating feed cup G pivoted thereto; the support arranged to engage the front portion of the bottom of the oscillating cup; means for tilting the trough downward and toward the support, and means for holding the oscillating cup in engagement with the support.

5. The combination in a fruit stoning machine of a series of suitably mounted traveling blades each provided with V shaped knife edges; suitable devices arranged to remove the meat from the pit; a pit removing device comprising a spindle attached to the frame of the machine, a sleeve journaled upon such spindle and provided at one end with a sweep arm and a sweep actuating arm rigidly attached to each other and to such sleeve and arranged at an angle with each other, the sweep actuating arm being arranged to normally project into the path of suitable traveling sweep actuating devices arranged to engage therewith to actuate the sweep to dislodge the pits from the V shaped knife edges; suitable means for returning such arms to their normal position; and such sweep actuating devices.

6. A fruit stoning machine comprising the combination of a series of traveling blades provided with the V shaped knife edges; suitable devices arranged to remove the meat from the pit; a tilting trough having its rear end provided with a slot to allow the passage of the blades therethrough; suitable means pivoting the trough to the frame of the machine and arranged at the front end of such trough; the stationary feed trough having the flaring lip at its lower end; the oscillating funnel shaped feed cup having the downwardly projecting arm arranged upon its rear side and passing through an opening in the bottom and near the upper end of the tilting trough, and having an opening in its front to allow the entrance of fruit into the cup, the bottom of the cup being rounded and arranged to slide upon the flaring lip of the stationary trough when the tilting trough is thrown toward the lower end of the stationary trough by tilting such tilting trough; a suitable pivotal point arranged near the bottom of the cup to allow oscillation of such cup, and means for tilting the trough, substantially as and for the purpose set forth.

7. In a fruit stoning machine, the combination of the sprocket chain; the sprocket wheels arranged to carry such chain; the blade attached to one link of such chain and having a portion of its body arranged to bear upon other links of the chain than the one to which the blade is attached.

8. In a fruit stoning machine the combination of the traveling blades provided with the V shaped knife edges; the spreader arranged to spread and strip the meat of the fruit from the pit, and having an arm extending from the body of the spreader to a point beyond the pivotal point upon which such spreader swings; and a tension spring attached to the arm of the spreader and arranged at an angle with such arm not greater than a right angle.

9. In a fruit stoning machine the combination of the feed chute; the tilting trough arranged at the lower end of such feed chute and provided in its rear end with the slot: intermediate means arranged to feed one fruit at a time from such feed chute into such tilting trough when such trough is tilted; the fruit stop arranged to project into the tilting trough through the slot when such trough is tilted, suitable traveling knives arranged to remove the fruit from the trough when it is returned to its normal position, and suitable means for operating the knives and tilting the trough.

10. In a fruit stoning machine substantially such as described, the combination of the belt provided with the projecting pins L; means for carrying and driving such belt; the arm K fixed to the tilting trough of the machine and provided with the shoulder $k$ and the arm $k'$ arranged in the path of the pins L to engage such pins substantially as and for the purpose set forth.

11. In a fruit stoning machine such as described, the combination of the tilting trough provided in its bottom near the front end with the arm receiving opening $f$; the support and guide for the front portion of the cup arranged in line with the tilting trough; the oscillating cup G provided with the arm $g$ inserted through the opening $f$ and provided with the catch G'; the spring $g^3$ arranged to engage such arm and catch to hold the cup in engagement with the support and to prevent upward displacement of the cup; and the pivotal point $g^2$ arranged between the arm $g$ and the rounded bottom of the cup to rest upon the trough.

JOHN SMITH BRIGGS.

Witnesses:
JAMES R. TOWNSEND,
F. M. TOWNSEND.